US006021944A

United States Patent [19]
Arakaki

[11] Patent Number: 6,021,944
[45] Date of Patent: Feb. 8, 2000

[54] TRANSACTION TERMINAL FOR ELECTRONIC PURSE TRANSACTIONS AND THE LIKE

[75] Inventor: James Arakaki, Campbell, Calif.

[73] Assignee: Hewlett-Packard Company, Palo Alto, Calif.

[21] Appl. No.: 09/068,983

[22] PCT Filed: Oct. 17, 1997

[86] PCT No.: PCT/US97/17550

§ 371 Date: May 26, 1998

§ 102(e) Date: May 26, 1998

[87] PCT Pub. No.: WO98/18097

PCT Pub. Date: Apr. 30, 1998

Related U.S. Application Data

[60] Provisional application No. 60/028,962, Oct. 18, 1996.

[51] Int. Cl.[7] ................................................. G06K 5/00
[52] U.S. Cl. .......................... 235/380; 235/383; 235/451; 235/472.01; 902/22; 902/26
[58] Field of Search ....................................... 235/380, 382, 235/383, 386, 449, 451, 472.01, 472.02, 492, 493; 902/22, 25, 26, 27

[56] References Cited

U.S. PATENT DOCUMENTS

| D. 289,819 | 5/1987 | Long | D99/28 |
|---|---|---|---|
| 4,032,931 | 6/1977 | Haker | 340/365 X |
| 4,277,837 | 7/1981 | Stuckert | 235/379 X |
| 4,454,414 | 6/1984 | Benton | 235/379 |
| 4,634,845 | 1/1987 | Hale et al. | 235/379 X |
| 4,683,536 | 7/1987 | Yamamoto | 235/380 X |
| 4,797,540 | 1/1989 | Kimizu | 235/383 |
| 5,267,149 | 11/1993 | Anada et al. | 235/379 X |
| 5,438,184 | 8/1995 | Roberts et al. | 235/380 |
| 5,811,770 | 9/1998 | Bonnemoy | 235/380 |

*Primary Examiner*—Michael G Lee
*Attorney, Agent, or Firm*—Bacon & Thomas, PLLC

[57] ABSTRACT

A double-ended transaction terminal with a clerk operated portion on one end, a customer operated portion on the other end and a card reader portion in the middle. The card reader portion has a housing extending above the base of the terminal to provide a mutual shield of the displays on customer and clerk operated terminal portions.

11 Claims, 2 Drawing Sheets

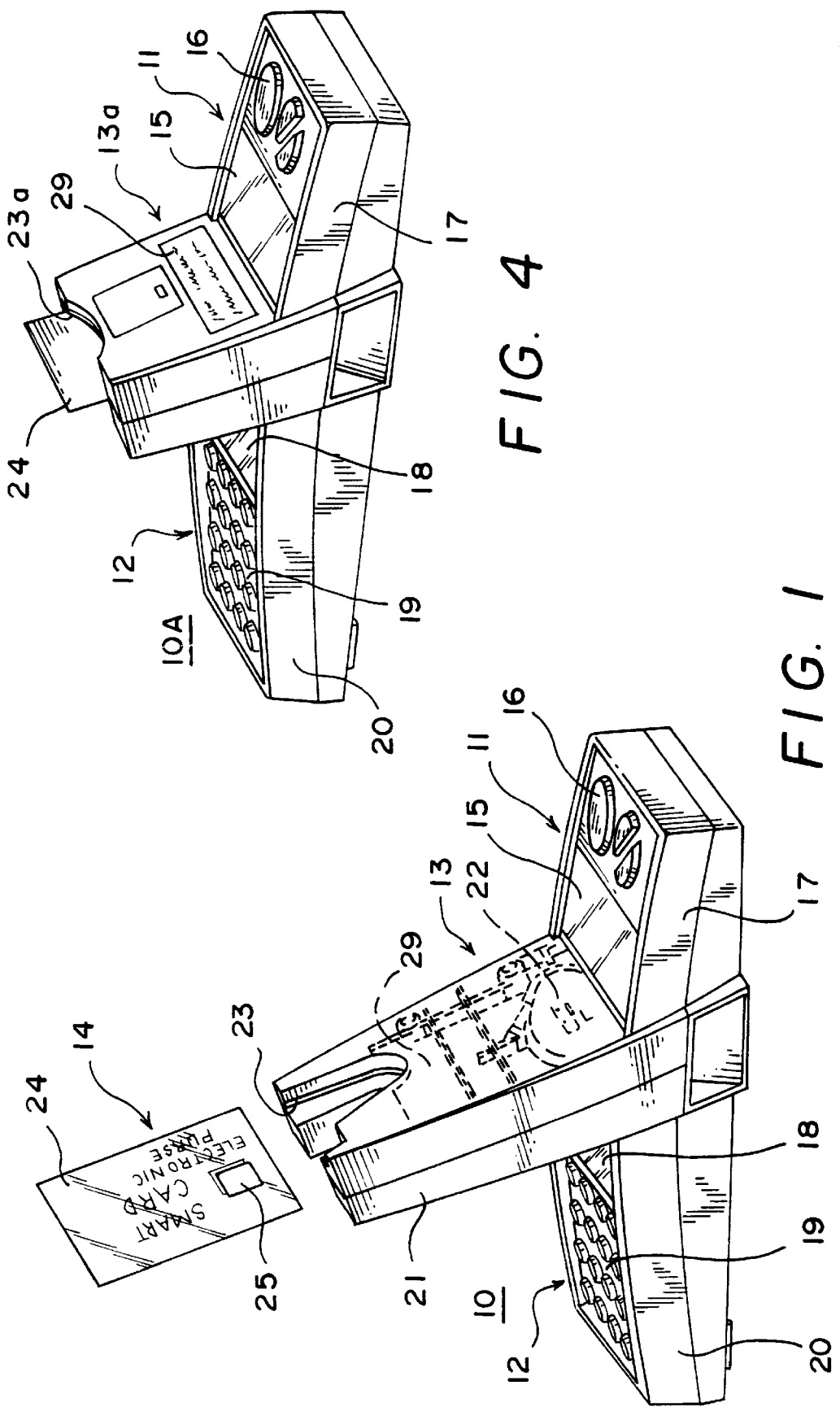

TRANSACTION TERMINAL FOR ELECTRONIC PURSE TRANSACTIONS AND THE LIKE

Provisional Application Ser. No. 60/028,962 filed Oct. 18, 1996 is hereby claimed.

BACKGROUND OF THE INVENTION

1. Field of the Invention

This invention relates generally to point-of-sale (POS) transaction terminals and, more specifically, to stand-alone POS transaction terminals which are configured for carrying out the steps of an entire transaction without being coupled to other devices or systems. Even more specifically, this invention relates to POS transaction terminals specially configured for facilitating transactions using an Electronic Purse type of smart card carried by a customer and requiring, among other things, keyboard actions by both the customer and the clerk or merchant to complete the steps of the transaction.

2. Related Prior Art

The following U.S. patents disclose POS transaction terminals which are adapted for use by a sales clerk in carrying out credit and debit transactions using plastic cards with magnetic data stripes thereon:

Chang et al. U.S. Pat. No. 4,788,420
Anglin et al. U.S. Pat. No. 5,164,576

These patents are exemplary of the genre of transaction terminals in which all data entry and card swipe operations are intended to be carried out by the sales clerk or merchant at the point-of-sale, after the customer has handed the clerk a credit or debit card.

Other commercial POS transaction terminals have been developed for operation by the cardholding customer. In such terminals the card swipe and the selection of transaction functions and entry of data such as PIN code number are all intended to be carried out by the customer. Examples of such terminals are the Pinstripe terminals marketed by VeriFone Inc. of Redwood City, Calif.

Co-pending and commonly assigned Meyer et al. U.S. patent application Ser. No. 08/419,676 discloses a portable transaction terminal having a single keyboard and display and intended for shared transaction data entry by the clerk or waiter and the customer. The waiter enters the transaction amount via the keyboard and then the customer does the card swipe and the entry of other transaction data following steps of an interactive menu provided on the display device.

The following design patents show various configurations of POS terminals of the single keyboard and display type: D364391, D367,044, and D372,730.

Roberts et al. U.S. Pat. No. 5,438,184, entitled: "METHOD & APPARATUS FOR ELECTRONIC CASH TRANSACTIONS" discloses a transaction terminal which is specifically designed for participating in an Electronic Purse type of POS transaction, but one in which the transaction data is entered on a separate POS device and communicated to the terminal for display to the customer. The terminal of the Roberts et al. '184 patent has only a display and a card reader/writer with insert slot, and related electronics, and is intended for use in transactions in which PIN entry is not required and in which the act of card insertion into the device is the customers acceptance of the transaction amount and approval for debiting that amount to the stored cash value in the Electronic Purse.

SUMMARY OF THE INVENTION

Objects of the Invention

It is the principal object of this invention to provide a POS transaction terminal which facilitates the carrying out of steps by both clerk and customer to complete a transaction.

It is another object of this invention to provide a POS transaction terminal specially adapted to carry out all steps of an Electronic Purse transaction.

Features of the Invention

This invention features a transaction terminal apparatus for transactions involving actions by a customer using a transaction card and actions by a clerk. The terminal has a main terminal housing comprising a customer terminal portion on one end thereof and having a top surface with a customer display device thereon, a clerk terminal portion provided on an opposite end thereof and having a top surface with a clerk display device thereon, and a card reader portion located between the customer portion and the clerk portion.

The card reader portion of the terminal comprises a card reader housing portion which extends upward from the top surfaces of the customer terminal portion and the clerk terminal portion a sufficient distance to provide a mutual display shield for both the clerk display device and the customer display device. A card reader is mounted within the card reader housing portion. A card insert slot is provided in a top portion of the card reader housing to facilitate card insertion by the customer while also providing clerk access thereto in case the customer requires assistance for proper card insertion.

Preferably, the customer terminal portion includes a customer key section on the top surface for operation by a customer, the customer key section being positioned near one end of the main terminal housing and the customer display device being positioned adjacent the card reader portion of the terminal.

Preferably, the clerk terminal portion includes a clerk keyboard on the top surface for operation by a clerk, the clerk keyboard being positioned near the other end of the main terminal housing and the clerk display device being positioned adjacent the card reader portion of the terminal.

A preferred embodiment of the invention is adapted specially for electronic purse type transactions not requiring entry of a PIN code or other data by a customer. In this embodiment, the card reader comprises a smart card reader/writer mechanism, the customer key section comprises a few function keys related to a limited set of transaction-related decisions to be entered by the customer; and the clerk key section comprises a keyboard with at least a numeric keypad for entry of transaction data, including the amount of the transaction.

Preferably, in all embodiments of the invention, the card reader housing portion of the terminal slopes away from the customer terminal portion and has a surface facing the customer on which operating instructions for the customer may be mounted.

A transaction terminal in accordance with this invention has the advantage of providing ease of operation for both the clerk and the customer with all operational elements in readily accessible locations and ergonomically friendly to both clerk and customer.

In particular the card reader/writer portion of the terminal provides an ergonomically friendly position for card insertion by the customer and also functions as a shield for the displays to the clerk and the customer. Deploying a card accepter housing portion as a spatially intersecting volume that divides the base portion of transaction terminal into two functional areas provides physical and psychological privacy to each area.

Other objects, features and advantages of this invention will be apparent from a review of the following detailed description of preferred embodiments thereof taken in conjunction with the accompanying drawings.

BRIEF DESCRIPTION OF THE DRAWINGS

FIG. 1 is an isometric view of a transaction terminal in accordance with a preferred embodiment of this invention.

FIG. 4 is an isometric view of a transaction terminal in accordance with an alternative embodiment of this invention.

DETAILED DESCRIPTION OF PREFERRED EMBODIMENTS

Figure 3:
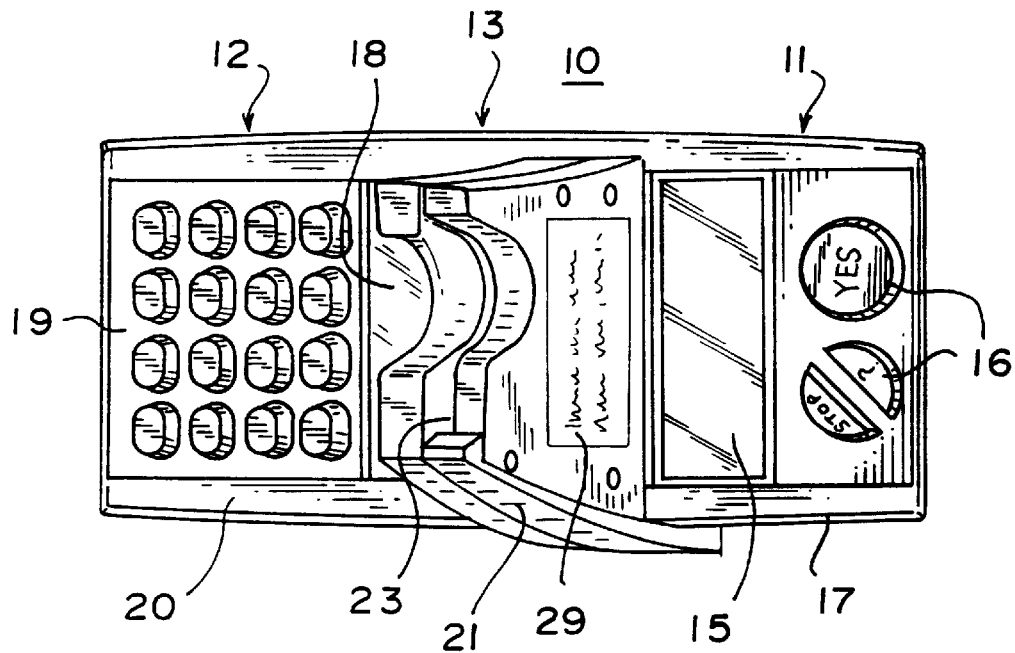
FIG. 3 is a top plan view of a transaction terminal in accordance with a preferred embodiment of this invention.
Figure 2:
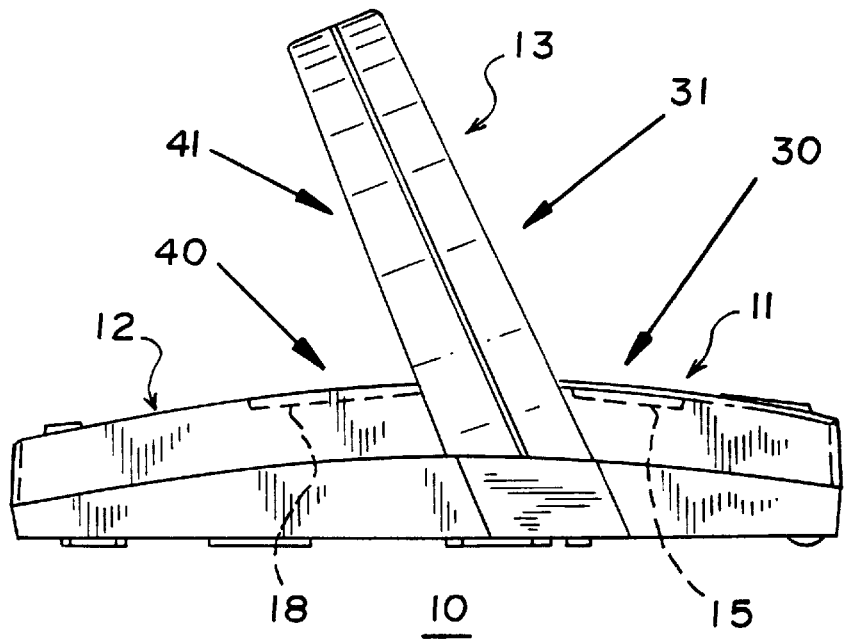
FIG. 2 is side elevational view of a transaction terminal in accordance with a preferred embodiment of this invention.

Referring to FIGS. 1–3, transaction terminal 10 in accordance with a preferred embodiment of this invention is specially configured and arranged for handling Electronic Purse and similar types of transactions involving actions by a customer using a smart card (Electronic Purse) 14 and a clerk. Transaction terminal 10 has a customer terminal portion 11 on one end thereof, a clerk terminal portion 12 provided on an opposite end thereof, and a card reader/writer portion 13 located therebetween.

Customer terminal portion 11 includes a customer display means 15 and a customer-operated keyboard 16 provided on a top surface of customer housing portion 17 and facing a customer operating said terminal. Clerk terminal portion 12 includes a clerk display means 18 and a clerk-operated keyboard 19 provided on a top surface of clerk housing portion 20.

Card reader/writer portion 13 comprises a smart card reader/writer mechanism 22 in card accepter housing portion 21 of said transaction terminal 10. Preferably, smart card reader/writer mechanism 22 is of the type disclosed in copending and commonly assigned patent application Ser. No. 08/729,366, filed on Oct. 16, 1996, and entitled: LANDING CONTACT MECHANISM AND CARD LATCH FOR SMART CARD READER/WRITER (DOCKET VFI-209/LCB).

FIG. 1 shows smart card reader/writer mechanism 22 inside card accepter housing portion 21, but it will be understood that this mechanism is usually hidden behind a front panel portion of card accepter housing portion 21. Card accepter housing portion 21 extends upward and slopes away from said customer terminal portion 11 a sufficient distance to provide a mutual display shield for both customer display means 15 and clerk display means 18. Card accepter housing portion 21 also presents an external housing surface area 29 facing the customer terminal portion and adapted to display terminal operating instructions to a customer.

Card accepter housing portion 21 has a card insert slot 23 provided in a top portion thereof to facilitate card insertion by a customer while also providing clerk access thereto in case the customer requires assistance in putting the smart card 14 in correctly.

Transaction terminal 10 is thus a double-ended terminal unit with two separate keyboard and display areas, one facing the retail customer (cardholder) and and the other facing a clerk/merchant handling data entry on the transaction itself. Card accepter housing portion 21 is oriented vertically between the two keyboard and display portions, with a layback angle relative to the customer side 11 of transaction terminal 10 that makes it more visible to the cardholder. This vertical card accepter housing portion 21 extends a substantial distance above the top surfaces of customer housing portion 17 and clerk housing portion 20 which greatly emphasizes the presence of the card reader/writer portion 13 and the insertion angle for smart card 14.

Deploying card accepter housing portion 21 as a spatially intersecting volume that divides the base portion of transaction terminal 10 into two functional areas provides physical and psychological privacy to each area. As shown in FIG. 2, a customer-cardholder views customer display means 15 from a viewing angle 30 which makes it easy to read the data displayed on customer display means 15. This data typically includes Electronic Purse balance data when smart card 14 is placed in position to be read by smart card reader/writer mechanism 22 inside card accepter housing portion 21. On the other hand a clerk has a viewing angle 41 to customer display means 15. Thus, even if the clerk could see portions of customer display means 15 the angle of viewing is such that, with typical LCD displays, displayed data would not be readable.

This data privacy is important to the cardholder, who understands that his/her smart card 14 is an Electronic Purse an wants to keep private the balance of cash stored in this Electronic Purse.

By providing this customer display security, customers will be encouraged to use the terminal with confidence that their personal financial data is confidential.

On the other hand, a customer has a blocked viewing angle 31 toward clerk display 18 and clerk-operated keyboard 19 which are more complex and might be confusing to the customer.

Customer terminal portion 11 of the transaction terminal 10 is easily visible to the cardholder and presents a greatly simplified user interface with a minimal number of keyboard buttons. The physical shape of card insert slot 23 on top of card reader/writer portion 13 provides strong visual cues as to the proper insertion of smart card 14, card. Card insertion slot 23 and an instructional graphic surface 29 are on parallel planes, making interpretation of such graphics easier. This card insertion angle visually leads the cardholder's eye to customer display 15 and simplified 3-key panel 16.

In a typical Electronic Purse transaction, the customer will insert his smart card 14 into card insert slot 23 and transaction terminal 10 will respond by reading the balance of cash stored in the Electronic Purse of smart card 14 and display it on customer display means 15. After a clerk has entered the transaction data on clerk-operated keyboard 19, customer display means 15 will display the transaction total and request the customer to indicate acceptance of the transaction by pressing the "YES" key of customer-operated keyboard 16. If the customer decided not to complete the transaction with his Electronic Purse, he may press the STOP key.

As previously indicated, the vertical extension and orientation of card accepter housing portion 21 tends to minimize the visibility of clerk terminal portion 12 which is much more complex than customer terminal portion 11.

The overall shape of transaction terminal 10 is unusual and thus provides the advantage that its presence will be easily recognized by cardholders, even in a complex, cluttered point of sale equipment setting.

It should be understood that the double ended terminal of this invention could also employ a drop-in type magnetic card reader of the type disclosed in the above-reference Meyer et al. co-pending application. In addition, the card reader could be a hybrid mechanism that has both smart card and magnetic stripe card reading capability.

It should be further understood that the keyboard of the customer terminal portion could also be provided with a numeric keypad for entry of a PIN code if desired, or could be provided with function keys that are related to display areas of the display to implement screen-addressable function keys.

FIG. 4 illustrates an alternative embodiment of this invention in the form of a transaction terminal 10A in which the height of card acceptance housing portion 13A is less than the length of a transaction card 14 and a portion of transaction card 14 projects from card entrance slot 23A. This shorter card acceptance housing portion still provides a mutual shield for the customer and clerk displays. This alternative embodiment also gives a clerk demarkation between the customer terminal portion and the clerk terminal portion and a sense of physical and psychological privacy to the customer display.

Thus it will be apparent that numerous changes could be made by persons of skill in the art without departing from the spirit and scope of the invention as claimed in the following claims.

What is claimed is:

1. A transaction terminal apparatus for transactions involving actions by a customer using a transaction card and actions by a clerk, said transaction terminal comprising:

a main terminal housing having a customer terminal portion on one end thereof and having a top surface with a customer display means thereon, a clerk terminal portion provided on an opposite end thereof and having a top surface with a clerk display means thereon, and a card reader portion located between said customer portion and said clerk portion;

said card reader portion comprising a card reader housing portion which extends upward from the top surfaces of said customer terminal portion and said clerk terminal portion a sufficient distance to provide a mutual display shield for both said clerk display means and said customer display means; and a card reader mounted within said card reader housing portion, including a card insert slot provided in a top portion of said card reader housing to facilitate card insertion by the customer while also providing clerk access thereto in case the customer requires assistance for proper card insertion.

2. Apparatus as claimed in claim 1, wherein said customer terminal portion includes a customer key section on said top surface for operation by a customer, said customer key section being positioned near one end of said main terminal housing and said customer display means being positioned adjacent said card reader portion of said terminal;

said clerk terminal portion including a clerk keyboard on said top surface for operation by a clerk, said clerk keyboard being positioned near the other end of said main terminal housing and said clerk display means being positioned adjacent said card reader portion of said terminal.

3. Apparatus as claimed in claim 2 adapted for electronic purse transactions not requiring entry of a PIN code or other data by a customer, wherein said card reader comprises a smart card reader/writer mechanism;

said customer key section comprises a few function keys related to a limited set of transaction-related decisions to be entered by the customer;

said clerk key section comprises a keyboard with at least a numeric keypad for entry of transaction data, including the amount of the transaction.

4. Apparatus as claimed in claim 1, wherein said card reader housing portion of said terminal slopes away from said customer terminal portion and has a surface facing said customer on which operating instructions for the customer may be mounted.

5. Apparatus as claimed in claim 1, wherein said card reader housing portion of said terminal extends vertically upward from top surface portions of said customer terminal portion and said clerk terminal portion a distance substantially greater than the length of said transaction card and is adapted to receive a full insertion of said transaction card.

6. Apparatus as claimed in claim 1, wherein said card reader housing portion of said terminal extends vertically upward from top surface portions of said customer terminal portion and said clerk terminal portion a distance substantially greater than one-half the length of said transaction card and is adapted to receive a partial insertion of said transaction card.

7. A transaction terminal for Electronic Purse transactions involving a customer using a smart card (Electronic Purse) and a clerk, said terminal comprising:

a main terminal housing having a customer terminal portion on one end thereof, and a clerk terminal portion provided on an opposite end thereof, a card acceptor housing positioned on said terminal housing between said customer terminal portion and said clerk terminal portion and having a smart card reader/writer mounted therein;

said customer terminal portion including a customer display means and a customer-operated keyboard provided on a top surface thereof and adapted to be positioned to be facing a customer;

said clerk terminal portion including a clerk display means and a clerk-operated keyboard provided on a top surface thereof and adapted to be positioned facing a clerk;

said card accepter housing portion of said transaction terminal extending upward from a top surface of said main terminal housing a sufficient distance to provide a mutual display shield for said clerk display means and said customer display means;

said card accepter housing portion having a card insert slot provided in a top portion thereof to facilitate card insertion by the customer while also providing clerk access thereto in case the customer requires assistance.

8. Apparatus as claimed in claim 7, wherein said card acceptor housing portion of said terminal slopes away from said customer terminal portion and has a forward surface facing said customer on which operating instructions for the customer may be mounted.

9. A transaction terminal for Electronic Purse transactions involving a customer using a smart card (Electronic Purse) and a clerk, said terminal comprising:

a customer terminal portion on one end thereof, a clerk terminal portion provided on an opposite end thereof, and a card reader/writer portion located therebetween, said customer terminal portion including a customer display means and a customer-operated keyboard provided on a top surface thereof and facing a customer operating said terminal, said clerk terminal portion including a clerk display means and a clerk-operated keyboard provided on a top surface thereof, said card reader/writer portion comprising a smart card reader/writer mechanism disposed in a card accepter housing portion of said transaction terminal which extends upward and slopes away from said customer terminal portion a sufficient distance to provide a mutual display shield for both said clerk display means and said customer display means while also presenting an external housing surface facing said customer terminal portion adapted to display terminal operating instructions to the customer, said card accepter housing portion having a card insert slot provided in a top portion thereof to facilitate card insertion by the customer while also providing clerk access thereto in case the customer requires assistance.

10. Apparatus as claimed in claim 9, wherein said card acceptor housing portion of said terminal extends vertically upward from top surface portions of said customer terminal portion and said clerk terminal portion a distance substantially greater than the length of said transaction card and is adapted to receive a full insertion of said transaction card.

11. Apparatus as claimed in claim 9, wherein said card acceptor housing portion of said terminal extends vertically upward from top surface portions of said customer terminal portion and said clerk terminal portion a distance substantially greater than one-half the length of said transaction card and is adapted to receive a partial insertion of said transaction card.

* * * * *